(12) United States Patent
Moynihan et al.

(10) Patent No.: US 10,063,336 B1
(45) Date of Patent: Aug. 28, 2018

(54) PROTECTED TRANSPONDED SERVICES INTEGRATED WITH CONTROL PLANE SWITCHED SERVICES

(71) Applicant: Ciena Corporation, Hanover, MD (US)

(72) Inventors: Jeffrey Scott Moynihan, Cumming, GA (US); Jeffery Thomas Nichols, Marietta, GA (US); John K. Oltman, Atlanta, GA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/791,519

(22) Filed: Oct. 24, 2017

(51) Int. Cl.
| | |
|---|---|
| *H04J 14/02* | (2006.01) |
| *H04J 14/00* | (2006.01) |
| *H04L 12/56* | (2006.01) |
| *H04L 12/64* | (2006.01) |
| *H04J 3/14* | (2006.01) |
| *H04L 12/24* | (2006.01) |
| *H04L 12/751* | (2013.01) |
| *H04L 12/707* | (2013.01) |
| *H04L 12/703* | (2013.01) |
| *H04L 12/26* | (2006.01) |

(52) U.S. Cl.
CPC ............ *H04J 3/14* (2013.01); *H04J 14/0227* (2013.01); *H04J 14/0284* (2013.01); *H04L 41/0659* (2013.01); *H04L 43/0811* (2013.01); *H04L 45/02* (2013.01); *H04L 45/22* (2013.01); *H04L 45/28* (2013.01); *H04J 2203/006* (2013.01)

(58) Field of Classification Search
CPC ...... H04J 3/14; H04J 14/0227; H04J 14/0284; H04L 41/0659; H04L 45/02; H04L 45/22; H04L 45/28

USPC ...................................... 398/1, 2, 43, 44, 45
See application file for complete search history.

(56) References Cited

U.S. PATENT DOCUMENTS

| | | | | |
|---|---|---|---|---|
| 4,630,045 | A * | 12/1986 | Georgiou | H04Q 3/521 340/2.25 |
| 5,157,654 | A * | 10/1992 | Cisneros | H04L 12/5601 370/414 |
| 5,166,926 | A * | 11/1992 | Cisneros | H04L 12/5601 370/392 |
| 6,751,699 | B1 * | 6/2004 | Langley, Sr. | H04L 49/357 370/360 |

(Continued)

OTHER PUBLICATIONS

Cisco Systems, Inc., Cisco Catalyst 6500 Series, Supervisor Engine 720, 1992-2003, pp. 1-21, (0301R), MH/LW4273 Mar. 2003.

*Primary Examiner* — Oommen Jacob
(74) *Attorney, Agent, or Firm* — Clements Bernard Walker PLLC; Christopher L. Bernard; Lawrence A. Baratta, Jr.

(57) ABSTRACT

A line module configured to provide a protected transponded service includes a plurality of ports; switch interface circuitry communicatively coupled to a switch module; and interface circuitry communicatively coupled to the plurality of ports and the switch interface circuitry, wherein the interface circuitry includes a cross-point switch between the plurality of ports and the switch interface circuitry; wherein bandwidth of the plurality of ports is greater than bandwidth of the switch interface circuitry to the switch module; and wherein the protected transponded service is configured between the plurality of ports directly via the interface circuitry and is selectively routed to the switch module via the switch interface circuitry for restoration thereof, responsive to a failure.

20 Claims, 10 Drawing Sheets

(56) References Cited

U.S. PATENT DOCUMENTS

| | | | | |
|---|---|---|---|---|
| 6,813,241 B1* | 11/2004 | Wang | H04L 45/00 | 370/216 |
| 6,879,559 B1* | 4/2005 | Blackmon | H04L 45/00 | 370/216 |
| 6,882,765 B1* | 4/2005 | Erickson | H04J 14/0227 | 385/147 |
| 7,099,578 B1* | 8/2006 | Gerstel | H04J 14/0295 | 370/216 |
| 7,436,763 B1* | 10/2008 | Phelps | H04J 3/14 | 370/219 |
| 8,155,515 B2* | 4/2012 | Shah | H04Q 11/0062 | 398/12 |
| 8,412,038 B2* | 4/2013 | Natori | H04J 14/0297 | 398/1 |
| 8,559,812 B2 | 10/2013 | Oltman et al. | | |
| 8,619,553 B2 | 12/2013 | Madrahalli et al. | | |
| 9,143,227 B2 | 9/2015 | Moynihan et al. | | |
| 9,240,905 B2* | 1/2016 | Connolly | H04L 12/6402 | |
| 9,538,264 B2 | 1/2017 | Surek et al. | | |
| 2003/0185376 A1* | 10/2003 | Carson | H04Q 3/68 | 379/221.15 |
| 2005/0243716 A1* | 11/2005 | Bitar | H04L 1/22 | 370/218 |
| 2008/0131128 A1* | 6/2008 | Ota | H04J 14/0201 | 398/79 |
| 2008/0298799 A1* | 12/2008 | Takihiro | H04L 12/2861 | 398/2 |
| 2010/0027989 A1* | 2/2010 | Lewis | H04J 14/0227 | 398/2 |
| 2010/0034532 A1* | 2/2010 | Ghelfi | H04J 14/0204 | 398/2 |
| 2011/0052186 A1* | 3/2011 | Honda | H04J 3/14 | 398/23 |
| 2011/0116790 A1* | 5/2011 | Sakauchi | H04J 14/0204 | 398/5 |
| 2012/0237199 A1* | 9/2012 | Akiyama | H04J 3/14 | 398/2 |
| 2012/0257538 A1* | 10/2012 | Deguchi | H04L 45/026 | 370/254 |
| 2013/0051796 A1* | 2/2013 | Yano | H04Q 11/00 | 398/34 |
| 2013/0195440 A1* | 8/2013 | Tominaga | H04J 14/0275 | 398/2 |
| 2015/0055952 A1* | 2/2015 | Younce | H04J 14/0212 | 398/48 |
| 2015/0365186 A1* | 12/2015 | Schimpe | H04J 14/021 | 398/50 |
| 2015/0365193 A1 | 12/2015 | Connolly et al. | | |
| 2016/0209724 A1* | 7/2016 | Testa | G02F 1/313 | |
| 2017/0099354 A1 | 4/2017 | Moynhan et al. | | |
| 2017/0105060 A1 | 4/2017 | Oltman et al. | | |

\* cited by examiner

PROTECTED TRANSPONDED SERVICES INTEGRATED WITH CONTROL PLANE SWITCHED SERVICES

FIELD OF THE DISCLOSURE

The present disclosure generally relates to optical networking systems and methods. More particularly, the present disclosure relates to protected transponded services integrated with control plane switched services.

BACKGROUND OF THE DISCLOSURE

Typically, services in optical transport systems, optical networks, etc. can be divided into two categories, namely transponded/muxponded services and switched services. These categories are based on the underlying equipment used to realize the service. Specifically, transponded/muxponded services are Optical-Electrical-Optical (OEO) converted between a client side and a line side via a transponder/muxponder, and brought in the network without going through a switch fabric. Going forward, both transponded and muxponded services are collectively referred to as transponded services. That is, transponded services are realized with optical transponders which can include framing, Forward Error Correction (FEC), Operations, Maintenance, Administration, and Provisioning (OAM&P), etc. The switched services include the switch fabric allowing for signal mapping, multiplexing, etc. as well as protection, routing, etc. While the tranponder allows a low-cost point of entry, the protection options are limited and generally only available as wavelength restoration (i.e., Layer 0 Restoration) which can be complicated and slow. The second category utilizes a switch and a control plane or Software Defined Networking (SDN) controller to set up and restore services. However, the entry cost can be higher than that of the transponder because of additional line and switch modules required. In both cases, the client services can be mapped into an Optical Transport Network (OTN) container gaining entry to the transport network.

BRIEF SUMMARY OF THE DISCLOSURE

In an embodiment, a line module configured to provide a protected transponded service includes a plurality of ports; switch interface circuitry communicatively coupled to a switch module; interface circuitry communicatively coupled to the plurality of ports and the switch interface circuitry, wherein the interface circuitry includes a cross-point switch between the plurality of ports and the switch interface circuitry; wherein bandwidth of the plurality of ports is greater than bandwidth of the switch interface circuitry to the switch module; and wherein the protected transponded service is configured between the plurality of ports directly via the interface circuitry and is selectively routed to the switch module via the switch interface circuitry for restoration thereof, responsive to a failure. The protected transponded service can be mesh restored via one or more of a control plane and a Software Defined Networking (SDN) controller responsive to the failure utilizing bandwidth freed on the switch interface circuitry due to the failure. The cross-point switch can switch at a granularity of X and the switch module switches at a granularity of Y, X>>Y. The protected transponded service can be selectively routed to the switch module via a protect path through the switch interface circuitry, and wherein the protect path includes freed bandwidth based on the failure. A switched service can be provided via the plurality of ports to the switch module via the switch interface circuitry, and wherein the switched service is transported over a same port as the protected transponded service. The plurality of ports can be formed by one or more optical transceivers plugged into pluggable interfaces which are communicatively coupled to the interface circuitry. The plurality of ports can include line-side ports and client-side ports, and wherein the protected transponded service can be between one of i) a line-side port and a client-side port, and ii) a pair of line-side ports. The protected transponded service can include a plurality of ports multiplexed as a muxponder to a line-side port.

In another embodiment, a method of providing a protected transponded service in a line module including a plurality of ports includes operating the protected transponded service between at least two ports via interface circuitry communicatively coupled to the plurality of ports, wherein the interface circuitry includes a cross-point switch between the plurality of ports and switch interface circuitry, and wherein bandwidth of the plurality of ports is greater than bandwidth of the switch interface circuitry to a switch module; and, responsive to a failure on one or more ports of the plurality of ports, selectively switching the protected transponded service to the switch module via the switch interface circuitry for restoration thereof. The method can further include mesh restoring the protected transponded service via one or more of a control plane and a Software Defined Networking (SDN) controller responsive to the failure utilizing bandwidth freed on the switch interface circuitry due to the failure. The cross-point switch can switch at a granularity of X and the switch module switches at a granularity of Y, X>>Y. The method can further include selectively switching the protected transponded service to the switch module via a protect path through the switch interface circuitry, wherein the protect path includes freed bandwidth based on the failure. A switched service can be provided via the plurality of ports to the switch module via the switch interface circuitry, and wherein the switched service can be transported over a same port as the protected transponded service. The plurality of ports can be formed by one or more optical transceivers plugged into pluggable interfaces which are communicatively coupled to the interface circuitry. The plurality of ports can include line-side ports and client-side ports, and wherein the protected transponded service can be between one of i) a line-side port and a client-side port, and ii) a pair of line-side ports. The protected transponded service can include a plurality of ports multiplexed as a muxponder to a line-side port.

In a further embodiment, a switch configured to provide a protected transponded service includes one or more switch modules; and a plurality of line modules communicatively coupled to the one or more switch modules and each including one or more ports; switch interface circuitry communicatively coupled to the one or more switch modules; interface circuitry communicatively coupled to the one or more ports and the switch interface circuitry, wherein the interface circuitry includes a cross-point switch between the one or more ports and the switch interface circuitry; wherein bandwidth of the plurality of ports is greater than bandwidth of the switch interface circuitry to the one or more switch modules; and wherein the protected transponded service is configured between the plurality of ports directly via the interface circuitry and is selectively routed to the one or more switch modules via the switch interface circuitry for restoration thereof, responsive to a failure. The protected transponded service can be mesh restored via one or more of a control plane and a Software Defined Networking (SDN)

controller responsive to the failure. The cross-point switch can switch at a granularity of X and the one or more switch modules switches at a granularity of Y, X>>Y. A switched service can be provided to the one or more switch modules via the switch interface circuitry, and wherein the switched service can be transported over a same port as the protected transponded service.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to protected transponded services integrated with control plane switched services. Specifically, the present disclosure introduces a third category of service in an optical network, namely the protected transponded services integrated with control plane switched services, which incorporate the advantages of both the transponded and switched services. The protected transponded service is mapped into an OTN container and transponded on the same line module (LM), i.e., entering through a client port, mapped to OTN, and exiting through a line port (e.g., coherent modem). In a first configuration, the service path is analogous to a transponder, and could also utilize multiplexing on the ingress (i.e., muxponder—simple multiplexing such as 4:1). That is, in the first configuration, the service path is solely through a line module. Advantageously, in a second configuration, the transponder can be selectively connected to the switch fabric, allowing restoration of the transponded service through the switch and control plane network.

Optical Network

Figure 1:
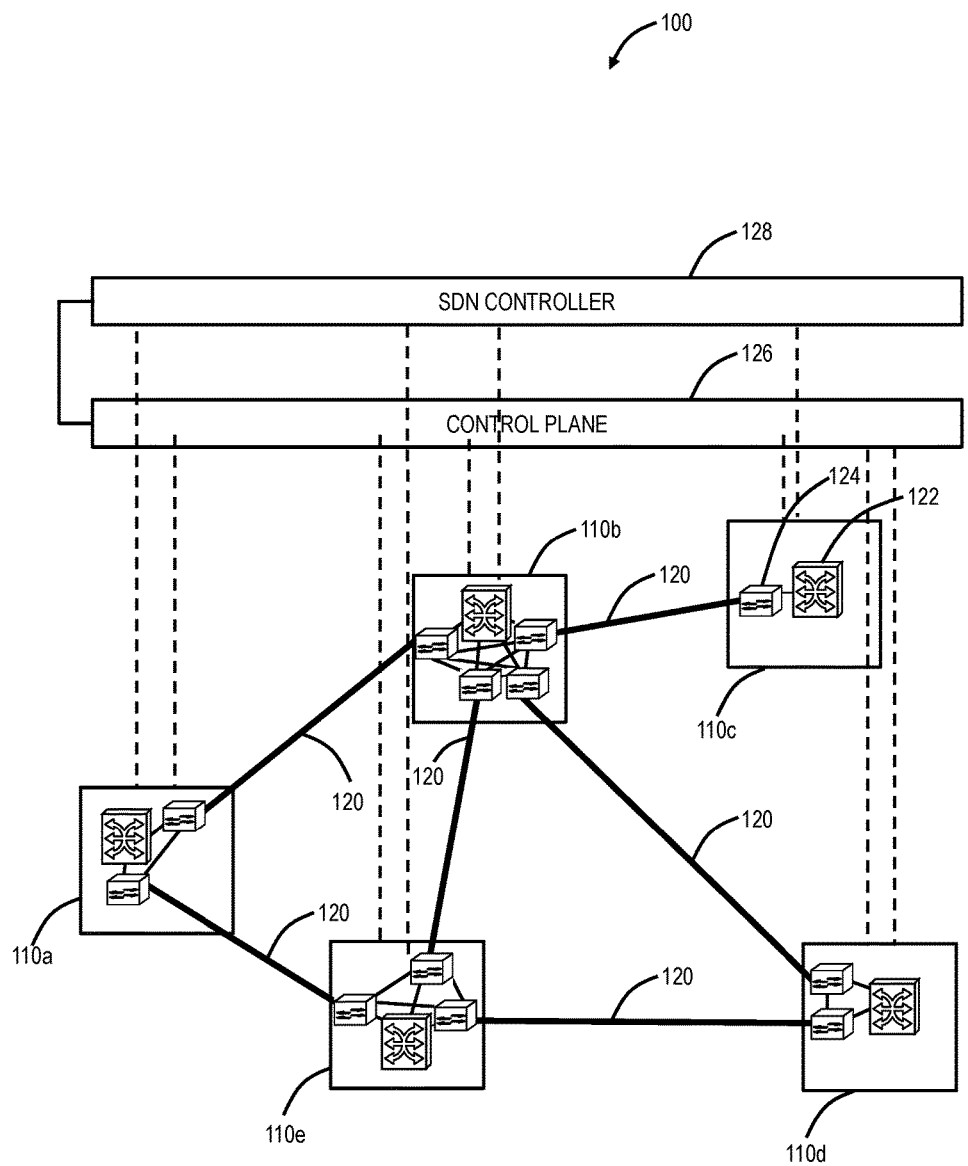
FIG. 1 is a network diagram of an example optical network with five interconnected sites.

FIG. 1 is a network diagram of an example optical network 100 with five interconnected sites 110a, 110b, 110c, 110d, 110e. The sites 110 are interconnected by a plurality of links 120. Each of the sites 110 can include a switch 122 and one or more Wavelength Division Multiplexed (WDM) network elements 124. The switch 122 is configured to provide services at Layers 1 (e.g., Optical Transport Network (OTN)) and/or Layer 2 (e.g., Ethernet). In this disclosure, the switch 122 is configured to perform the transponded services, the switched services, and the new third category of services described herein, namely the protected transponded services integrated with control plane switched services.

The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill would understand that the switch 122 and the WDM network elements 124 may be realized in the same network element. Also, various functions of each could be implemented in multiple network elements. The photonic layer can also include intermediate amplifiers and/or regenerators on the links 120 which are omitted for illustration purposes. The optical network 100 is illustrated, for example, as an interconnected mesh network, and those of ordinary skill in the art will recognize the network 100 can include other architectures, with additional sites 110 or with fewer nodes sites, with additional network elements and hardware, etc.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 126 operating on and/or between the switches 122 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and establishing connections.

The optical network 100 can also include a Software Defined Networking (SDN) controller 128. SDN allows management of network services through abstraction of lower level functionality. This is done by decoupling the system that makes decisions about where traffic is sent (SDN control through the SDN controller 128) from the underlying systems that forward traffic to the selected destination (i.e., the physical equipment in the optical network 100). Work on SDN calls for the ability to centrally program provisioning of forwarding on the optical network 100 in order for more flexible and precise control over network resources to support new services. The SDN controller 128 is a processing device that has a global view of the optical network 100. Additionally, the SDN controller 128 can include or connect to SDN applications which can utilize the data from the SDN controller 128 for various purposes. Also, the SDN controller 128 can operate along with the control plane 126, such as in a hybrid control scheme.

Network Element/Node

Figure 2:
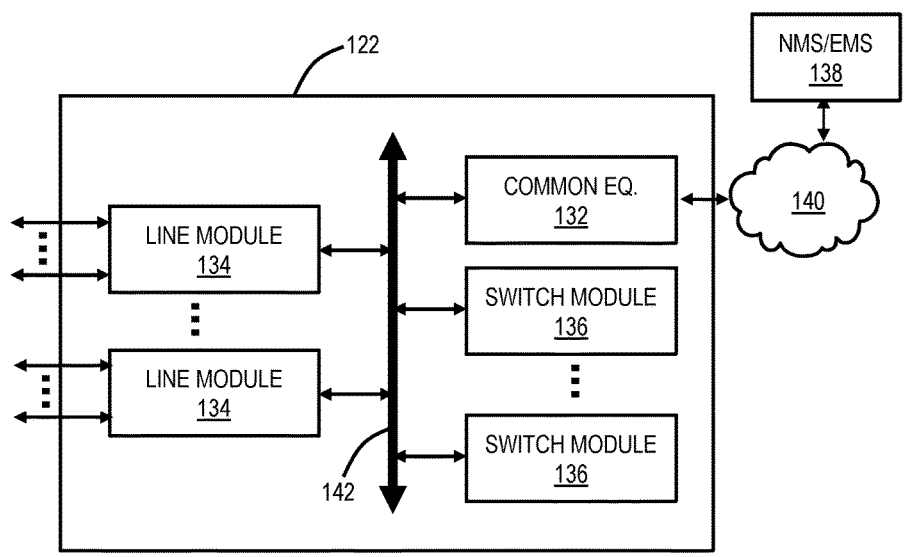
FIG. 2 is a block diagram of an example switch for use with the systems and methods described herein.

FIG. 2 is a block diagram of an example switch 122 for use with the systems and methods described herein. For example, the switch 122 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the switch 122 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the switch 122 can be any digital system with ingress and egress digital signals and switching of channels, timeslots, tributary units, etc. While the switch 122 is generally shown as an optical network element, the systems and methods contemplated for use with any switching fabric, network element, or network-based thereon.

In an embodiment, the switch 122 includes common equipment 132, one or more line modules 134, and one or more switch modules 136. The common equipment 132 can include power; a control module; operations, administration, maintenance, and provisioning (OAM&P) access; user interface ports; and the like. The common equipment 132 can connect to a management system 138 through a data communication network (DCN) 140 (as well as a Path Computation Element (PCE), the SDN controller 128, OpenFlow controller, etc.). The management system 138 can include a network management system (NMS), element management system (EMS), or the like. Additionally, the common equipment 132 can include a control plane processor, such as a controller 150 illustrated in FIG. 3 configured to operate the control plane as described herein. The switch 122 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the switch 122. In an embodiment, the line modules 134 can form ingress and egress switches with the switch modules 136 as center stage switches for a three-stage switch, e.g., a three-stage Clos switch. Other configurations and/or architectures are also contemplated. The line modules 134 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, OTSiG, Flexible Ethernet (FlexE), Flexible OTN (FlexO), etc.

Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, 100 Gb/s, N×1.25 Gb/s, N×100 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the switch 122, and each line module 134 can include one or more physical ports. The switch modules 136 are configured to switch channels, timeslots, tributary units, packets, etc. between the line modules 134. For example, the switch modules 136 can provide OTN granularity such as Optical Channel Data Unit-0 (ODU0), Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), etc.; SONET/SDH granularity such as Synchronous Transport Signal (STS-1)m etc; Ethernet granularity; and the like. Specifically, the switch modules 36 can include Time Division Multiplexed (TDM) (i.e., circuit switching) and/or packet switching engines. The switch modules 136 can include redundancy as well, such as 1:1, 1:N, etc. In an embodiment, the switch modules 136 provide OTN switching and/or Ethernet switching.

Those of ordinary skill in the art will recognize the switch 122 can include other components which are omitted for illustration purposes, and that the systems and methods described herein are contemplated for use with a plurality of different network elements with the switch 122 presented as an example type of network element. For example, in another embodiment, the switch 122 may not include the switch modules 136, but rather have the corresponding functionality in the line modules 134 (or some equivalent) in a distributed fashion. For the switch 122, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the switch 122 is merely presented as one example of a switch 122 for the systems and methods described herein.

Controller

Figure 3:
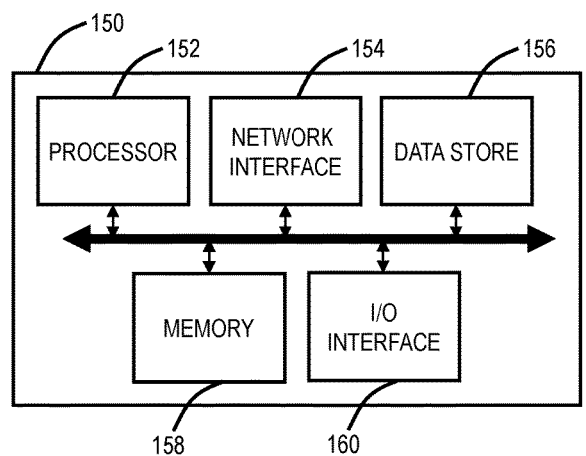
FIG. 3 is a block diagram of a controller to provide control plane processing and/or operations, administration, maintenance, and provisioning (OAM&P) for the switch of FIG. 2, and/or to implement a Software Defined Networking (SDN) controller in FIG. 1.

FIG. 3 is a block diagram of a controller 150 to provide control plane processing and/or operations, administration, maintenance, and provisioning (OAM&P) for the switch 122, and/or to implement a Software Defined Networking (SDN) controller. The controller 150 can be part of the common equipment, such as common equipment 132 in the switch 122, or a stand-alone device communicatively coupled to the switch 122 via the DCN 140. In a stand-alone configuration, the controller 150 can be an SDN controller 128, an NMS, a PCE, etc. The controller 150 can include a processor 152 which is a hardware device for executing software instructions such as operating the control plane 126. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within memory 158, to communicate data to and from the memory 158, and to generally control operations of the controller 150 pursuant to the software instructions. The controller 150 can also include a network interface 154, a data store 156, the memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the switches 122 and the WDM network elements 124, and the like. The network interface 154 can include, for example, an Ethernet card or a wireless local area network (WLAN) card. The network interface 154 can include address, control, and/or data connections to enable appropriate communications on the DCN 140. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other nodes, such as using overhead associated with OTN signals.

In an embodiment, the controller 150 is configured to communicate with other controllers 150 in the network 100 to operate the control plane 126 for control plane signaling. This communication may be either in-band or out-of-band. Out-of-band signaling may use an overlaid Internet Protocol (IP) network such as, for example, User Datagram Protocol (UDP) over IP. In an embodiment, the controllers 150 can include an in-band signaling mechanism utilizing OTN overhead. The General Communication Channels (GCC) defined by ITU-T Recommendation G.709 are in-band side channels used to carry transmission management and signaling information within Optical Transport Network elements.

The controller 150 is configured to operate the control plane 126 in the network 100. That is, the controller 150 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 150 can include a topology database that maintains the current topology of the network 100 based on control plane signaling (e.g., HELLO messages) and a connection database that maintains available bandwidth on the links 120 again based on the control plane signaling. Again, the control plane is a distributed control plane 126; thus, a plurality of the controllers 150 can act together to operate the control plane 126 using the control plane signaling to maintain database synchronization. In source-based routing, the controller 150 at a source node for a connection is responsible for path computation and establishing by signaling other controllers 150 in the network 100, such as through a SETUP message. As described herein, the connection refers to a signaled, end-to-end connection such as an SNC, SNCP, LSP, etc. which are generally a service. Path computation generally includes determining a path, i.e., traversing the links through the nodes from the originating node to the destination node based on a plurality of constraints such as administrative weights on the links, bandwidth availability on the links, etc.

Transponded Vs. Switched Services

Figure 4:
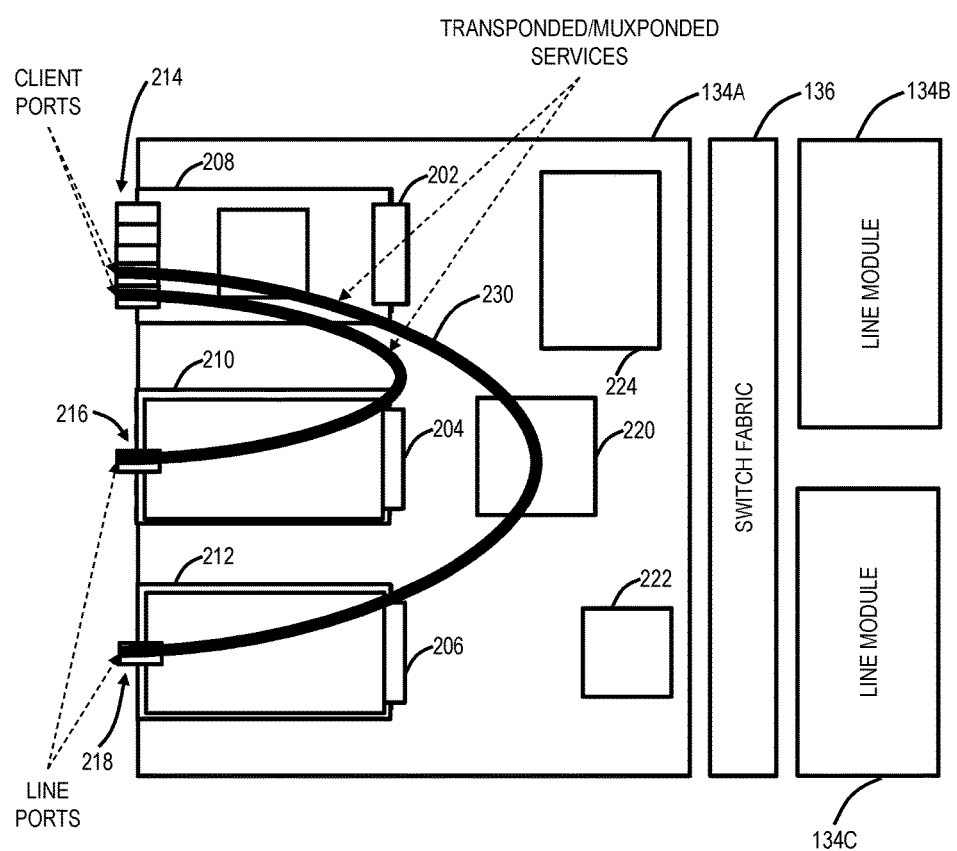
FIG. 4 is a block diagram of the switch of FIG. 2 illustrating a detailed line module and connectivity to a switch module and two additional line modules with transponded/muxponded services remaining on the line module between ports.
Figure 5:
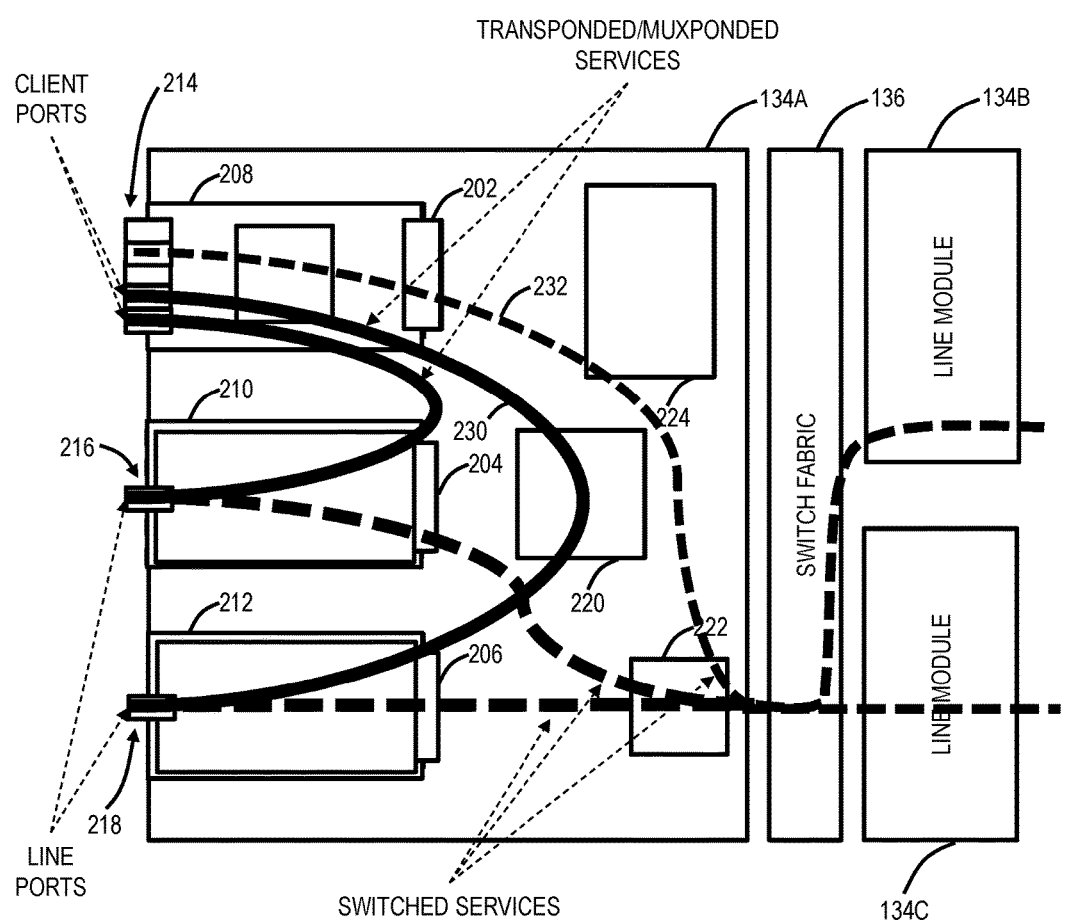
FIG. 5 is a block diagram of the switch of FIG. 2 illustrating a detailed line module and connectivity to a switch module and two additional line modules with switched services between the line module, the switch module, and the additional line modules.
Figure 6:
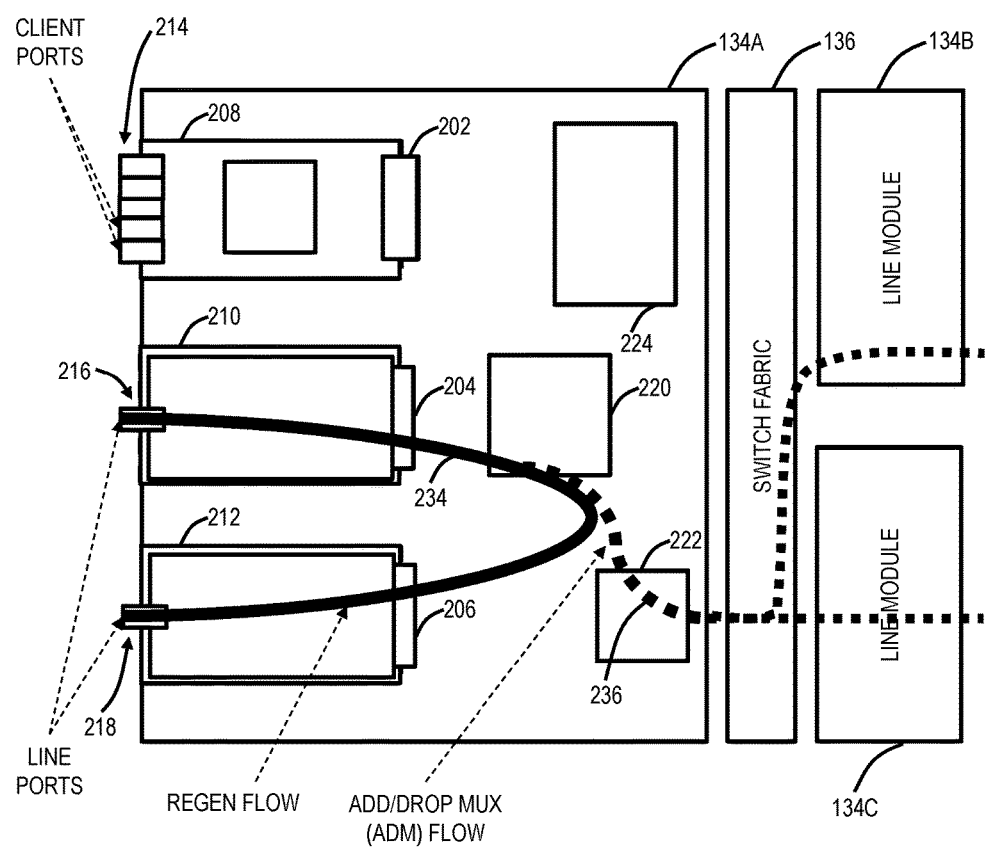
FIG. 6 is a block diagram of the switch of FIG. 2 illustrating a detailed line module and connectivity to a switch module and two additional line modules with a regen flow remaining on the line module between ports and an add/drop multiplexer (ADM) flow between the line module, the switch module, and the additional line modules.

FIGS. 4, 5, and 6 are block diagrams of a switch 122 illustrating a line module 134A with associated components and connectivity to a switch module 136 and two additional line modules 134B, 134C. Specifically, FIGS. 4, 5, and 6 are logical diagrams showing component detail on the line module 134A and interconnections with the switch module 136 and the additional line modules 134B, 134C. Note, the various modules 134A, 134B, 134C, 136 can be interconnected via the interface 142.

For example, the line module 134A can include three pluggable interfaces 202, 204, 206 each configured to receive an optical transceiver 208, 210, 212 selectively. In this example, the optical transceiver 208 includes a plurality of client ports 214, e.g., 5 ports 214, and the optical transceivers 210, 212 are line-side coherent optical modems each with a single line port 216, 218. Also, in this example, assume each of the pluggable interfaces 202, 204, 206 supports 500 Gb/s, i.e., each of the optical transceivers 208, 210, 212 support 500 Gb/s of capacity with the optical transceiver 208 supporting 5×100 Gb/s (each of the client ports 214 is 100 Gb/s) and the optical transceivers 210, 212 each support 500 Gb/s (each of the line ports 216, 218 is 500 Gb/s). Those skilled in the art will recognize other values, capacity, configurations, etc. are also contemplated.

The line module 134A can also include interface circuitry 220 which is configured to connect the pluggable interfaces 202, 204, 206 to one another and switch interface circuitry 222 which is configured to connect a portion of the bandwidth from the pluggable interfaces 202, 204, 206 to the switch module 136. The line module 134A can also include a processor 224 for control and management of the line module 134A. Using the aforementioned example capacities (500 Gb/s for each of the pluggable interfaces 202, 204, 206), the switch interface circuitry 222 can support 500 Gb/s and the interface circuitry 220 can support 2 Tb/s. Of course, other amounts are contemplated.

Thus, each slot in the line module 134A has a switching capacity limited to 500 Gb/s. However, the line module 134A has the three pluggable interfaces 202, 204, 206 which support up to three 500 Gb/s interfaces (via the optical transceivers 208, 210, 212 and the ports 214, 216, 218). The pluggable interfaces 202, 204, 206 can either support client-side optics or line-side optics (in this example, the pluggable interface 202 provides the client-side optics through the optical transceiver 208 and the pluggable interfaces 204, 206 provide the line-side optics through the optical transceivers 210, 212). The client-side optics can interface to local devices such as via shorter reach physical modules (e.g., less than 100 km). The line-side optics can interface to the network 100 such as via longer reach physical modules, e.g., coherent optical modems, etc. That is, both the client-side optics and the line-side optics support optical interfaces, the associated physical characteristics are based on the application requirements.

Thus, prior to the framing/mux logic on the line module 134A, there is a 2 Tb/s cross-point functionality between the pluggable interfaces 202, 204, 206 and the switch interface circuitry 222. That cross-point allows for the interconnection of the 3×500 G associated with each pluggable interface 202, 204, 206 and the 500 G associated with the framer/fabric, i.e., the switch interface circuitry 222.

In these examples, the pluggable interfaces 204, 206 are each populated with the optical transceivers 210, 212 which can each support 500 Gb/s capable modems such as operating as a single OTUC10 (OTUCn—Optical Transport Unit "C" n where C means 100 and n is an integer). In this case, the single OTUC10 has n=10 which is a single 1 Tb/s Optical Tributary Signal Group (OTSiG) which is formed by the 2×500 Gb/s Optical Tributary Signals (OTSi) from each of the line ports 216, 218. The third pluggable interface 202 in this example may provide 5×100 Gb/s of client traffic that is "muxponded" into the line ports 216, 218 via interconnection through the crosspoint, i.e., the interface circuitry 220, while another 500 Gb/s is "switched" into the line ports 216, 218 from the switch module 136 via the switch interface circuitry 222.

FIG. 4 illustrates transponded/muxponded services 230 (solid line) which remain on the line module 134A, e.g., between one of the client ports 214 and one of the line ports 216, 218. A transponded service provides the same signal from the line module 134A, such as with Optical-Electrical-Optical (OEO) conversion, framing, Forward Error Correction, OAM&P (Operations, Administration, Maintenance, and Provisioning), etc. A sample use case for a transponded service includes taking a client from a router, switch, etc. and providing direct access to the optical network 100. A muxponded service is similar to transponded service but may include aggregation, e.g., 4×1 where four client ports 214 are combined into a single signal to the line port 216. The key for the transponded/muxponded services 230 is they do not require switching via the switch module 136 and can remain within the line module 134A.

FIG. 5 illustrates switched services 232 (dotted line) which between the pluggable interfaces 204, 206, 208 and the switch module 136 via the switch interface circuitry 222. The transponded/muxponded services 230 and the switched services 232 may share a common transport wavelength or more OTSiG. This is illustrated in FIG. 5 where traffic sourced both from local client ports 214 and those from client ports 214 switched through the switch module 136 from other line modules 134B, 134C may be combined on a single wavelength. In essence, multiple OTUCn may be carried by a single OTSiG.

FIG. 6 illustrates a regen flow 234 (solid line) and an add/drop multiplexer (ADM) flow 236 (dotted line). The regen flow 234 is similar to the transponded service but is between two line ports 216, 218 (whereas the transponded or muxponded service is between the client port 214 and the line ports 216, 218). In FIG. 6, where multiple such OTUCn are carried by an OTSiG, one or more such OTUCn may be bypassed directly between OTSiG providing a regen/switch bypass capability for the regen flow 234 while other OTUCn are dropped into the switch fabric 136 for further grooming/protection/restoration for the ADM flow 236. The regen flow 234 is similar to the transponded/muxponded services 230, and each can be collectively referred to as transponded flows. The ADM flow 236 is also similar to the switches services 232 and can be collectively referred to as switched flows.

Thus, the line module 134A supports the transponded flows and switched flows simultaneously in the same module 134A. That is, optical network elements can support these two categories of services—transponded services and switched services. The transponded services allow a low-cost point of entry, but the protection options are limited and generally only available as wavelength restoration (i.e., Layer 0 Restoration) which can be complicated and slow. The second category of the switched services utilizes the switch module 136 (switch) and the control plane 126 and/or the SDN controller 128 to set up and restore services. However, the entry cost can be higher than that of the transponder because of additional line and switch modules required. In both cases, the client services can be mapped into an OTN container gaining entry to the network 100.

Protected Transponded Services

Again, the systems and methods described herein provide a third category of service in addition to the transponded services and switched services, namely protected transponded services which support the advantages of both the transponded services and switched services in a single transport application. Similar to FIGS. 4, 5, and 6, FIGS. 7, 8, and 9 are block diagrams of the switch 122 illustrating a line module 134A with associated components and connectivity to a switch module 136 and two additional line modules 134B, 134C for illustration of the protected transponded services.

Figure 7:
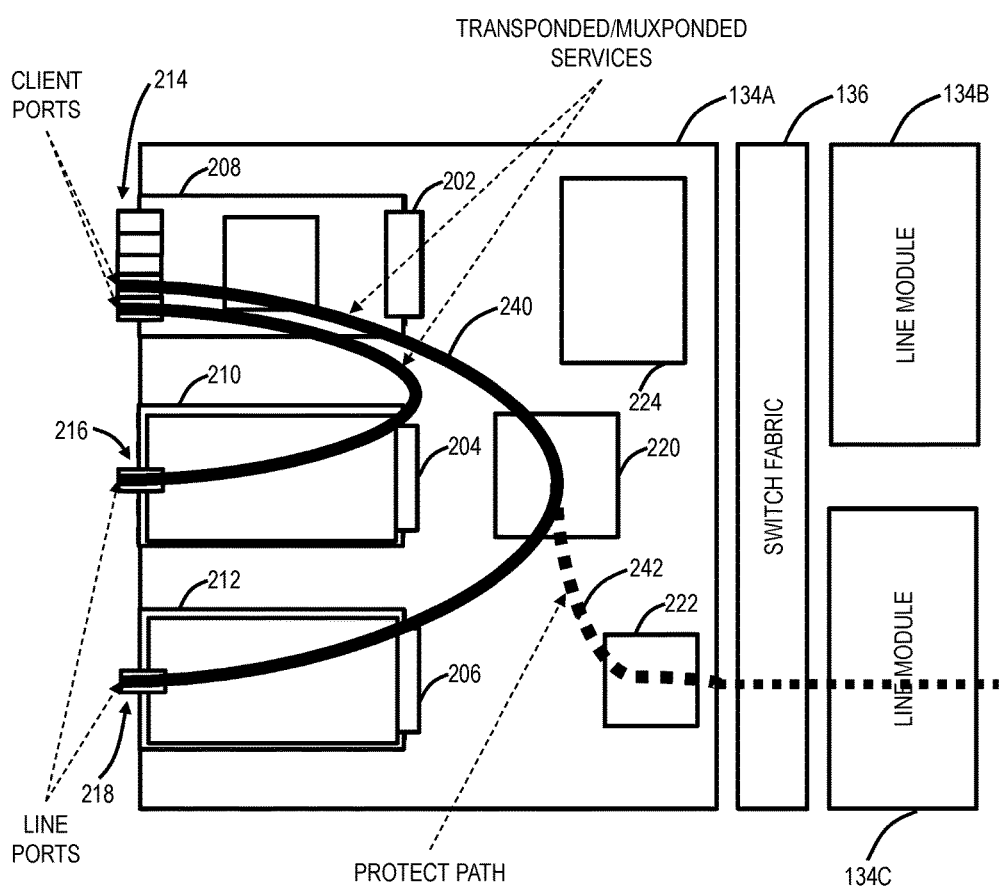
FIG. 7 is a block diagram of the switch of FIG. 2 illustrating a detailed line module and connectivity to a switch module and two additional line modules with protected transponded services remaining on the line module between ports with a protect path to the switch module.

FIG. 7 is a block diagram of the switch 122 illustrating a protected transponded service 240 remaining on the line module 134A between the ports 214, 218 with a protect path 242 to the switch module 136 via the switch interface circuitry 222. The protected transponded service 240 can be framed (e.g., mapped into an OTN container), and transponded on the line module 134A between the ports 214, 218. This service path is analogous to a transponder, and there could also be multiplexing on the ingress at the client ports 214 (i.e., muxponder).

The protected transponded service 240 can be selectively connected to the switch module 136 via the switch interface circuitry 222, allowing restoration of the protected transponded service 240 through the switch module 136 and via the control plane 126 and/or the SDN controller 128. This concept is based on an oversubscription of the slot bandwidth in the pluggable interfaces 204, 206, 208 by having more bandwidth on the faceplate (the ports 214, 216, 218) than the switch module 136 can otherwise switch via the switch interface circuitry 222. Note, while the protected transponded service 240 is shown selectively connecting to the switch module 136 for restoration, it is also possible to restore the protected transponded service 240 on the line module 134A itself, without the switch module 136.

Thus, the line module 134A can simultaneously support transponded services, switched services, and the protected transponded service 240. That is, in an embodiment, the line module 134A can support the transponded/muxponded services 230, the switched services 232, and the protected transponded service 240, due to the oversubscription of the bandwidth on the faceplate.

The protected transponded service 240 operates in a first configuration as a transponded service, e.g., between the client port 214 and the client port 218 remaining on the line module 134A. The protected transponded service 240 can dynamically transition from the transponded service to a switched service by routing the transponded/muxponded flow through the switch module 136 instead of the line port 218. By performing this transition, the protected transponded service 240 could utilize the control plane 126 and/or the SDN controller 128 to mesh restore across the network 100.

Figure 8:
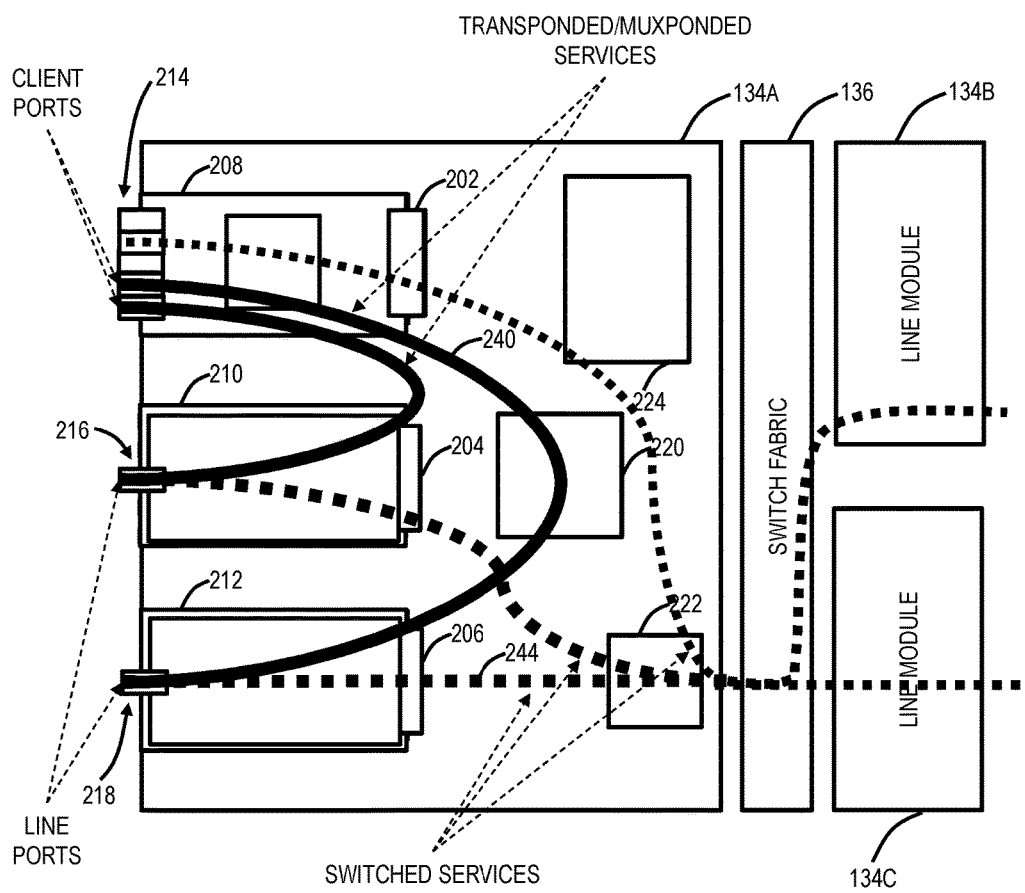
FIG. 8 is a block diagram of the switch of FIG. 2 illustrating a detailed line module and connectivity to a switch module and two additional line modules with protected transponded services remaining on the line module between ports with a protect path to the switch module along with switched services concurrently supported on the line module.
Figure 9:
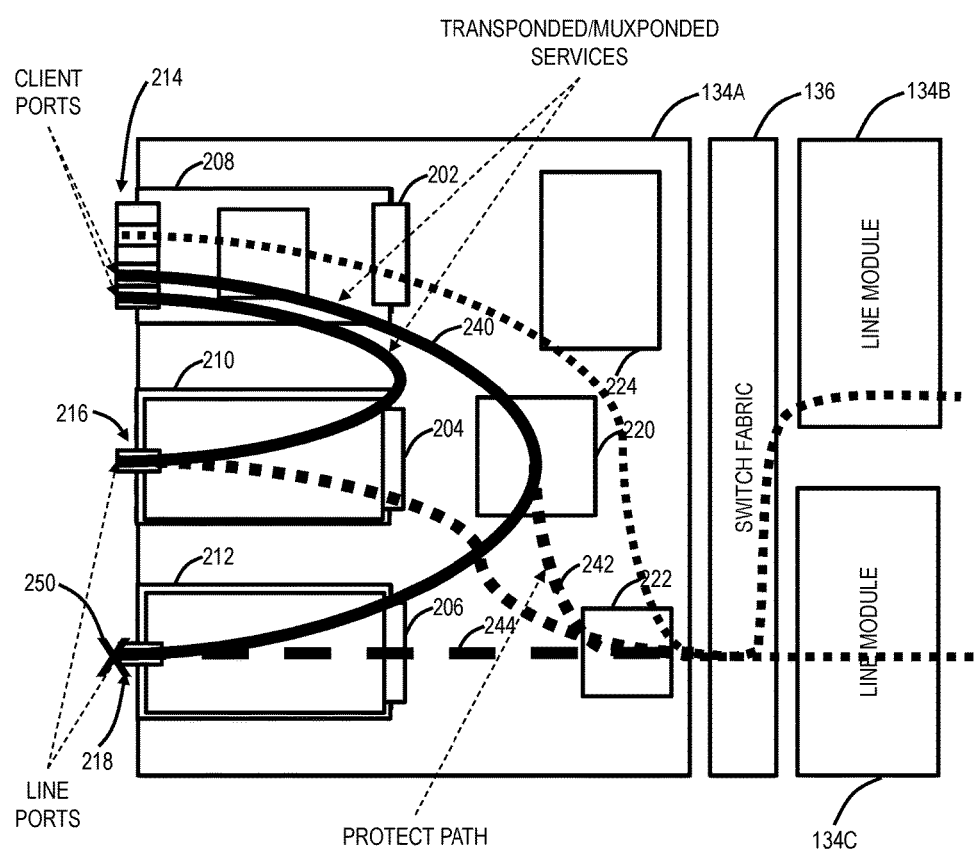
FIG. 9 is a block diagram of the switch of FIG. 8 illustrating a fault affecting a line port and associated switching of the protected transponded services.

FIG. 8 is a block diagram of the switch 122 with the protected transponded service 240 with a switched service 244 concurrently supported on the line module 134A. FIG. 9 is a block diagram of the switch 122 illustrating a fault 250 affecting the line port 218 and associated switching of the protected transponded service 240. Given both transponded and switched traffic share fate as they are transported via a common interface 206, both types of traffic are impacted simultaneously during a failure event, i.e., the fault 250. The fault 250 can be a fiber cut, equipment failure, etc., i.e., anything causing some switching event on the port 218 (e.g., Loss of Frame (LOF), Loss of Signal (LOS), etc.). Specifically, in FIG. 8, the switch interface circuitry 222 can support the full 500 Gb/s in the examples described herein to the switch module 136 via the switched service 244 and other switched services. Thus, absent the fault 250, there is no additional capacity to the switch module 136 for the protected transponded service 240.

In a normal restoration/protection event, the switched service 244 is moved to an alternate path by the switch module 136 while the associated fabric capacity is stranded between the line port 218 and the switch module 136 via the switch interface circuitry 222. That is, subsequent to the fault 250; there is now excess capacity to the switch module 136 due to the loss of the switched service 244 to the switch module 136. Thus, the lost traffic from the switched service 244 can now be used to restore the protected transponded service 240 via the protect path 242. Here, the protected transponded service 240 is now switched via the switch module 136 to one of the line modules 134B, 134C for alternative routing to recover from the fault 250. The rerouting can be controlled by the control plane 126 and/or the SDN controller 128.

The fault 250 fundamentally frees the fabric capacity of that slot (pluggable interface 206) for now being used to "switch" the transponded traffic flows and allow for their restoration of diverse facilities as well. In such an event, the cross-point (the switch interface circuitry 222) is re-configured to make that possible and the opposite performed on reversion. Nominally, transponded flows make sense where the service can be routed with one hop as there would not be a need for switching to occur at intermediate sites outside of a restoration/protection event. In other words, they work well when there is a one-hop "home" path for the service.

There is a further capability to regenerate traffic that is connected between two line-side interfaces via the cross-point switch, i.e., the interface circuitry 220. That can be used to support greater than one hop paths that are "transponded." Such connections in this design could be limited to a granularity of an OTUC1 (100 Gb/s). Of course, the transponded services can be be at a lower granularity than an OTUC1. For example, with the addition of an ODUCn Mux in the switch 220, lower granularity switching is possible. In essence, the line module 134A design can be viewed as an OTUC1 switch/cross point which is followed by a 500 G ODU0 capable switch into the fabric. That is, the line module 134A can support cross-point switching at X Gb/s (e.g., X=100) while the switch module 136 can support Y Gb/s (e.g., Y=1.25). That is, X>>Y and in one embodiment the cross-point switching is at 100 Gb/s (OTUC1) and the switch module 136 is at Optical Channel Data Unit level 0 (ODU0) which is 1.25 Gb/s. Other embodiments are also contemplated.

Mesh Restoration of a Protected Transponded Service

Figure 10:
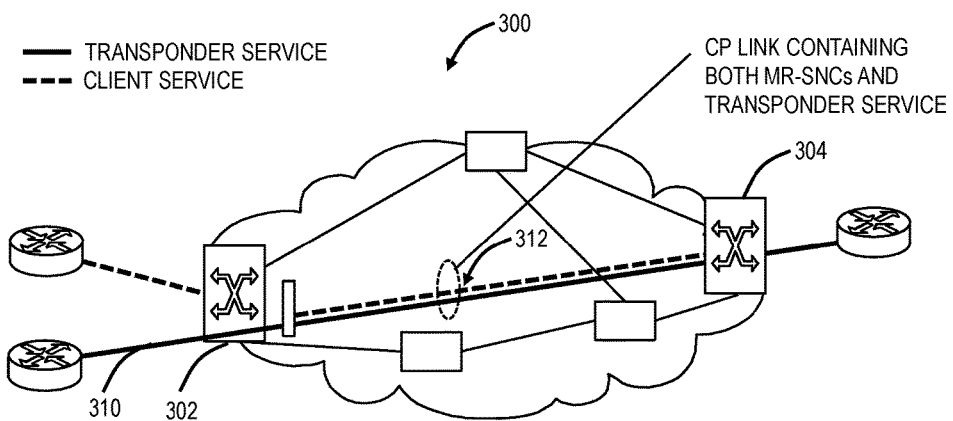
FIGS. 10 and 11 are network diagrams of a network with network elements and associated mesh restoration of a protected transponded service.
Figure 11:
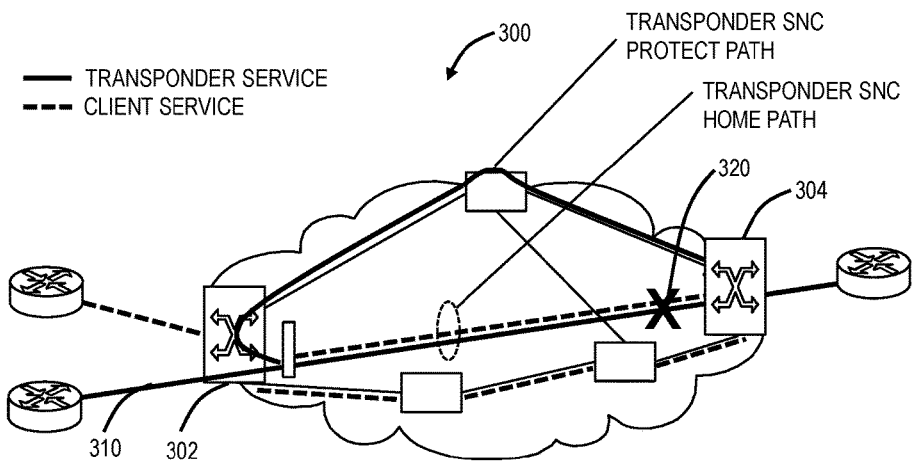

FIGS. 10 and 11 are network diagrams of a network 300 with network elements 302, 304 and associated mesh restoration of a protected transponded service 310. The protected transponded service 310 establishes a home path on the local line port on the same line module 134, thus while on the home path, the protected transponded service 310 does not utilize the bandwidth of the switch module 136. In FIG. 10, the protected transponded service 310 is transported in the network 300 on a link 312 managed by the control plane 126 which has both switched services (e.g., Mesh Restorable Subnetwork Connections (MR-SNCs)) and transponded services, while on its home path.

During a protection event such as due to a fault 320 in FIG. 11, the protected transponded service 310 would have access to the mesh network resources, either on the same line module 134 or rerouted through the switch module 136 to other line modules 134 in the switch 122, 302, 304. Similarly, any switched service carried by the supporting OTSiG may also be rerouted through the switch module 136 to other line modules 134 in the switch 122, 302, 304.

Again, any faulted switched service would no longer be utilizing the failed line; it would also no longer be utilizing its switch module 136 connections to the line module 134A. Therefore, this switch fabric bandwidth could be utilized by the protected transponded service 310 to be restored. Once the home path is repaired, the protected transponded service 310 would return to the home path on the local line module 134.

Thus, the systems and methods can selectively allocate resources on the line module 134A for transponded/muxponded services for fabric access. However, when transponded/muxponded services share a common shared risk/OTSiG, it is understood that the resources for fabric access used by the switched services may be reused by the transponded services while a failure is present on the interface. In such a case, the switched services will be restored to other interfaces freeing some or all access to the switch fabric capacity to be used by the transponded services.

Line Module

The line module 134A is configured to provide the protected transponded service 240. The line module 134A includes a plurality of ports 214, 216, 218; the switch interface circuitry 222 communicatively coupled to a switch module 136; the interface circuitry 220 communicatively coupled to the plurality of ports 214, 216, 218 and the switch interface circuitry 222, wherein the interface circuitry 220 includes a cross-point switch between the plurality of ports 214, 216, 218 and the switch interface circuitry 222; wherein bandwidth of the plurality of ports 214, 216, 218 is greater than bandwidth of the switch interface circuitry 222 to the switch module 136; and wherein the protected transponded service 240 is configured between the plurality of ports 214, 216, 218 directly via the interface circuitry 220 and is selectively routed to the switch module 136 via the switch interface circuitry 222 for restoration thereof, responsive to a failure.

The protected transponded service 240 can be mesh restored via one or more of a control plane 126 and a Software Defined Networking (SDN) controller 128 responsive to the failure. The cross-point switch can switch at a granularity of X and the switch module 136 can switch at a granularity of Y, X>>Y. The protected transponded service 240 is selectively routed to the switch module 136 via a protect path 242 through the switch interface circuitry 222, and wherein the protect path 242 includes freed bandwidth based on the failure. A switched service 244 can be provided via the plurality of ports 214, 216, 218 to the switch module 136 via the switch interface circuitry 222, and wherein the switched service 244 is transported over a same port as the protected transponded service 240. The plurality of ports 214, 216, 218 can be formed by one or more optical transceivers 208, 210, 212 plugged into pluggable interfaces 202, 204, 206 which are communicatively coupled to the interface circuitry 220. The plurality of ports 214, 216, 218 can include line-side ports and client-side ports, and wherein the protected transponded service 240 is between one of i) a line-side port and a client-side port, and ii) a pair of line-side ports. The protected transponded service 240 can include a plurality of ports 214, 216, 218 multiplexed as a muxponder to a line-side port.

Switch

The switch 122 is configured to provide a protected transponded service 240. The switch 122 includes one or more switch modules 136; and a plurality of line modules 134 communicatively coupled to the one or more switch modules 136 and each includes one or more ports 214, 216, 218; switch interface circuitry 222 communicatively coupled to the one or more switch modules 136; interface circuitry 220 communicatively coupled to the one or more ports 214, 216, 218 and the switch interface circuitry 222, wherein the interface circuitry 220 includes a cross-point switch between the one or more ports 214, 216, 218 and the switch interface circuitry 222; wherein bandwidth of the plurality of ports 214, 216, 218 is greater than bandwidth of the switch interface circuitry 222 to the one or more switch modules 136; and wherein the protected transponded service 240 is configured between the plurality of ports 214, 216, 218 directly via the interface circuitry 220 and is selectively routed to the one or more switch modules 136 via the switch interface circuitry 222 for restoration thereof, responsive to a failure. The protected transponded service 240 can be mesh restored via one or more of a control plane 126 and a Software Defined Networking (SDN) controller 128 responsive to the failure. The cross-point switch can switch at a granularity of X and the one or more switch modules 136 switches at a granularity of Y, X>>Y.

Process of Providing a Protected Transponded Service

Figure 12:
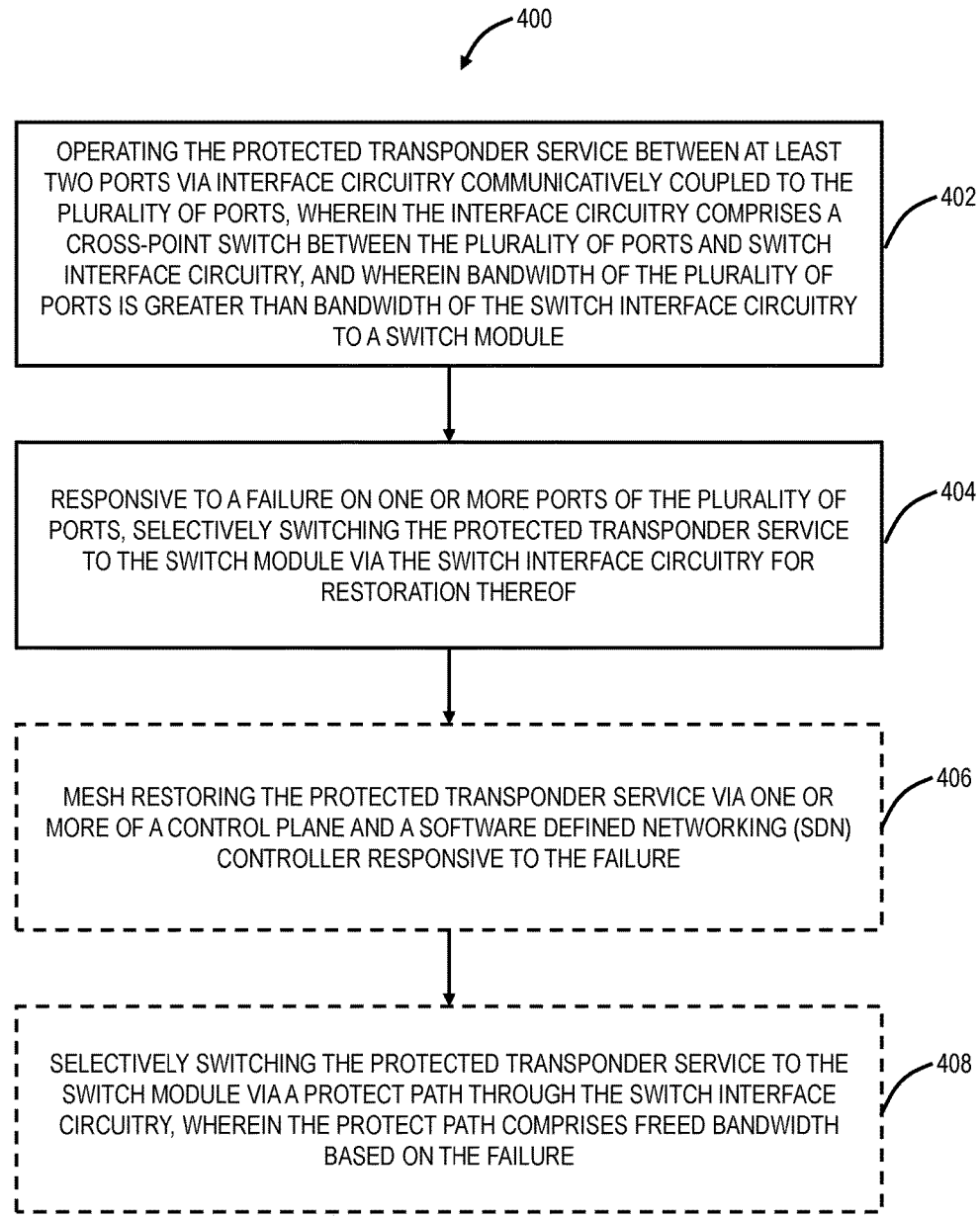
FIG. 12 is a flowchart of a process of providing a protected transponded service in a line module including a plurality of ports.

FIG. 12 is a flowchart of a process 400 of providing a protected transponded service in a line module including a plurality of ports. The process 400 includes operating the protected transponded service between at least two ports via interface circuitry communicatively coupled to the plurality of ports, wherein the interface circuitry includes a cross-point switch between the plurality of ports and switch interface circuitry, and wherein bandwidth of the plurality of ports is greater than bandwidth of the switch interface circuitry to a switch module (step 402). The process 400 further includes, responsive to a failure on one or more ports of the plurality of ports, selectively switching the protected transponded service to the switch module via the switch interface circuitry for restoration thereof (step 404). The process 400 can further include mesh restoring the protected transponded service via one or more of a control plane and a Software Defined Networking (SDN) controller responsive to the failure (step 406). The process 400 can further include selectively switching the protected transponded service to the switch module via a protect path through the switch interface circuitry, wherein the protect path comprises freed bandwidth based on the failure (step 408).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A line module configured to provide a protected transponded service, the line module comprising:
    a plurality of ports;
    switch interface circuitry communicatively coupled to a switch module;
    interface circuitry communicatively coupled to the plurality of ports and the switch interface circuitry, wherein the interface circuitry comprises a cross-point switch between the plurality of ports and the switch interface circuitry;
    wherein bandwidth of the plurality of ports is greater than bandwidth of the switch interface circuitry to the switch module; and
    wherein the protected transponded service is configured between the plurality of ports directly via the interface circuitry and is selectively routed to the switch module via the switch interface circuitry for restoration thereof, responsive to a failure.

2. The line module of claim 1, wherein the protected transponded service is mesh restored via one or more of a control plane and a Software Defined Networking (SDN) controller responsive to the failure utilizing bandwidth freed on the switch interface circuitry due to the failure.

3. The line module of claim 1, wherein the cross-point switch switches at a granularity of X and the switch module switches at a granularity of Y, X>>Y.

4. The line module of claim 1, wherein the protected transponded service is selectively routed to the switch module via a protect path through the switch interface circuitry, and wherein the protect path comprises freed bandwidth based on the failure.

5. The line module of claim 1, wherein a switched service is provided via the plurality of ports to the switch module via the switch interface circuitry, and wherein the switched service is transported over a same port as the protected transponded service.

6. The line module of claim 1, wherein the plurality of ports are formed by one or more optical transceivers plugged into pluggable interfaces which are communicatively coupled to the interface circuitry.

7. The line module of claim 1, wherein the plurality of ports comprise line-side ports and client-side ports, and wherein the protected transponded service is between one of i) a line-side port and a client-side port, and ii) a pair of line-side ports.

8. The line module of claim 1, wherein the protected transponded service comprises a plurality of ports multiplexed as a muxponder to a line-side port.

9. A method of providing a protected transponded service in a line module comprising a plurality of ports, the method comprising:
    operating the protected transponded service between at least two ports via interface circuitry communicatively coupled to the plurality of ports, wherein the interface circuitry comprises a cross-point switch between the plurality of ports and switch interface circuitry, and wherein bandwidth of the plurality of ports is greater than bandwidth of the switch interface circuitry to a switch module; and
    responsive to a failure on one or more ports of the plurality of ports, selectively switching the protected transponded service to the switch module via the switch interface circuitry for restoration thereof.

10. The method of claim 9, further comprising:
    mesh restoring the protected transponded service via one or more of a control plane and a Software Defined Networking (SDN) controller responsive to the failure utilizing bandwidth freed on the switch interface circuitry due to the failure.

11. The method of claim 9, wherein the cross-point switch switches at a granularity of X and the switch module switches at a granularity of Y, X>>Y.

12. The method of claim 9, further comprising:
    selectively switching the protected transponded service to the switch module via a protect path through the switch interface circuitry, wherein the protect path comprises freed bandwidth based on the failure.

13. The method of claim 9, wherein a switched service is provided via the plurality of ports to the switch module via the switch interface circuitry, and wherein the switched service is transported over a same port as the protected transponded service.

14. The method of claim 9, wherein the plurality of ports are formed by one or more optical transceivers plugged into pluggable interfaces which are communicatively coupled to the interface circuitry.

15. The method of claim 9, wherein the plurality of ports comprise line-side ports and client-side ports, and wherein the protected transponded service is between one of i) a line-side port and a client-side port, and ii) a pair of line-side ports.

16. The method of claim 9, wherein the protected transponded service comprises a plurality of ports multiplexed as a muxponder to a line-side port.

17. A switch configured to provide a protected transponded service, the switch comprising:
    one or more switch modules; and
    a plurality of line modules communicatively coupled to the one or more switch modules and each comprising:
        one or more ports;
        switch interface circuitry communicatively coupled to the one or more switch modules;
        interface circuitry communicatively coupled to the one or more ports and the switch interface circuitry, wherein the interface circuitry comprises a cross-point switch between the one or more ports and the switch interface circuitry;
        wherein bandwidth of the plurality of ports is greater than bandwidth of the switch interface circuitry to the one or more switch modules; and
        wherein the protected transponded service is configured between the plurality of ports directly via the interface circuitry and is selectively routed to the one or more switch modules via the switch interface circuitry for restoration thereof, responsive to a failure.

18. The switch of claim 17, wherein the protected transponded service is mesh restored via one or more of a control plane and a Software Defined Networking (SDN) controller responsive to the failure.

19. The switch of claim 17, wherein the cross-point switch switches at a granularity of X and the one or more switch modules switches at a granularity of Y, X>>Y.

20. The switch of claim 17, wherein a switched service is provided to the one or more switch modules via the switch interface circuitry, and wherein the switched service is transported over a same port as the protected transponded service.

* * * * *